United States Patent [19]

Koistinen et al.

[11] Patent Number: 4,617,715

[45] Date of Patent: Oct. 21, 1986

[54] METHOD FOR PRELIMINARY ANCHORING OF A WIRE ROPE BOLT

[75] Inventors: Pauli A. T. Koistinen; Risto J. Hämäläinen, both of Joensuu, Finland

[73] Assignee: OY Tampella AB, Tampere, Finland

[21] Appl. No.: 515,592

[22] Filed: Jul. 21, 1983

[30] Foreign Application Priority Data

Aug. 3, 1982 [FI] Finland ................................ 822707

[51] Int. Cl.$^4$ ............................................ B23P 19/04
[52] U.S. Cl. ........................................ 29/456; 29/240; 29/235; 29/525; 405/259
[58] Field of Search .................. 29/525, 456, 228, 433, 29/241, 240, 240.5, 235; 72/145; 405/259; 411/483, 508; 52/698, 704, 705, 706

[56] References Cited

U.S. PATENT DOCUMENTS

| | | | |
|---|---|---|---|
| 2,690,693 | 10/1954 | Campbell | 405/259 X |
| 4,051,940 | 10/1977 | Kuelzer | 29/525 X |
| 4,102,030 | 7/1978 | King, Jr. | 29/525 X |
| 4,250,681 | 2/1981 | Helderman | 405/259 X |

FOREIGN PATENT DOCUMENTS 613118  6/1978  U.S.S.R. ............................ 405/259

Primary Examiner—Charlie T. Moon
Attorney, Agent, or Firm—Wood, Dalton, Phillips Mason & Rowe

[57] ABSTRACT

The invention relates to a method and mechanism for preliminary anchoring of a wire rope bolt in a bore by means of friction. The object is to eliminate the need to use wooden wedges or to bend the strands of the rope backwards, procedures which are time-consuming. In accordance with the invention, a permanent deformation is produced in the wire rope bolt in such a way that friction force is produced when parts of the bolt press against the wall of the bore. The mechanism may comprise, fitted at a point prior to feeding rolls, a bending roll, which bends the wire rope before it is fed into the bore. The circumference of the feeding roll can be V-shaped, in which case it causes the bent wire rope to rotate and to become helical.

7 Claims, 3 Drawing Figures

METHOD FOR PRELIMINARY ANCHORING OF A WIRE ROPE BOLT

BACKGROUND OF THE INVENTION

1. Field of the Invention

The object of the invention is a method for preliminary anchoring of a wire rope bolt by means of friction in holes drilled in the ceiling or walls of an excavation. The invention also relates to a mechanism for carrying out the preliminary anchoring.

2. Description of the Prior Art

A wire rope bolt is anchored in a hole by means of, for example, cement plaster or various chemical mixes. For the duration of the drying of the plaster and mixes the wire rope must be anchored. Previously the preliminary anchoring has been carried out by using wooden wedges, or the ends of the strands of the wire rope have been bent backwards, in which case the wire rope can be pushed into the hole, but its falling out is prevented. The disadvantage of these anchoring methods is their time-consuming procedure, since the anchoring must be done manually.

SUMMARY OF THE INVENTION

The object of this invention is to carry out the preliminary anchoring of a bolt mechanically in connection with bolting and thereby to speed up the anchoring substantially. In order to achieve this, the invention provides a method of the character described above, which comprises providing the friction force by producing in the wire rope bolt a permanent deformation in such a way that the bolt in part presses against the wall of the bore. In accordance with the invention, a wire rope is thus anchored preliminarily by producing friction between the bolt and the bore by means of a mechanism which bends the bolt while the bolt is being fed into the bore. The mechanism comprises members for producing a permanent deformation of the bolt.

BRIEF DESCRIPTION OF THE DRAWINGS

The invention is described below in greater detail with the aid of the accompanying drawings, in which.

DESCRIPTION OF THE PREFERRED EMBODIMENTS

The mechanism for feeding and preliminary anchoring of a wire rope bolt in general includes a base movable by a power engine of its own. In the accompanying figures, however, such a base is not depicted, and the mechanism shown in the figures comprises only the actual feeding and preliminary anchoring mechanism.

Figure 1:
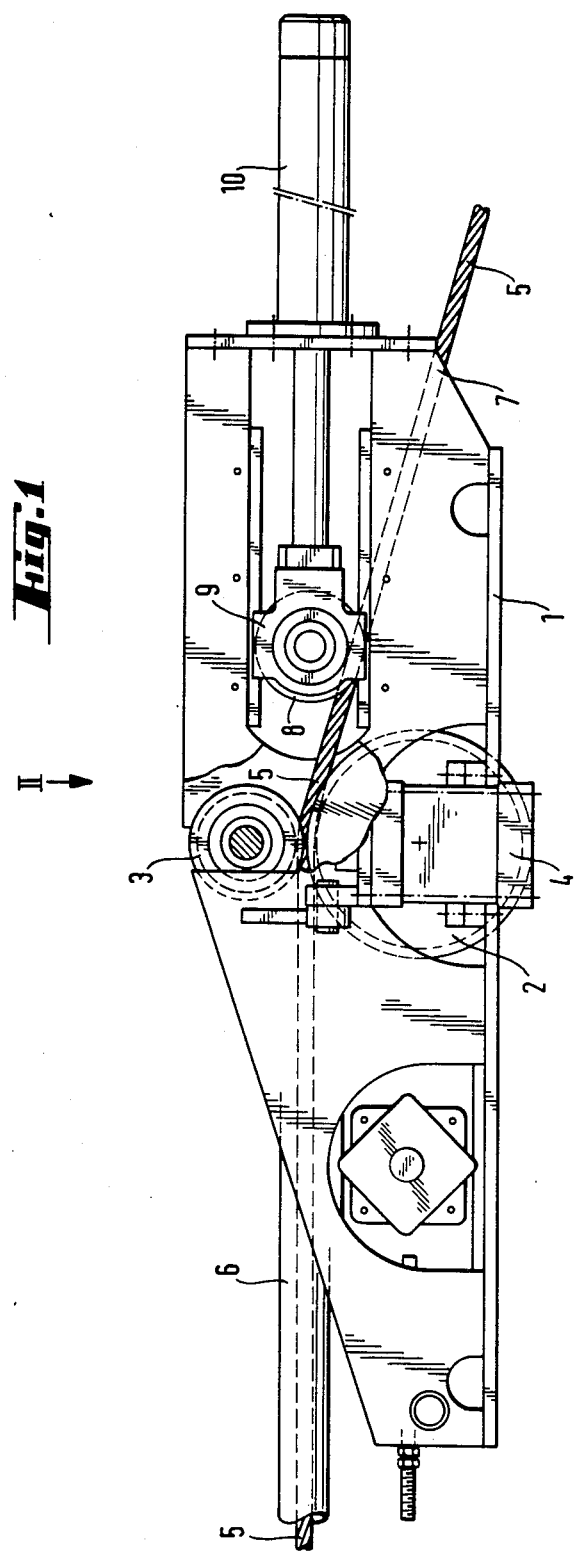
FIG. 1 depicts a side view of one embodiment of the mechanism according to the invention.

In FIG. 1, a wire rope feeding roll 2 is attached with bearings to the base plate 1. Facing the feeding roller above there is a pressing roll 3, the shaft of which is attached with bearings at one end, and at the other end of the shaft there is a compressed air cylinder 4 or a similar device, by means of which the required compressive force is produced between the feeding roll and the pressing roll. The wire rope 5 is fed from between the feeding roll 2 and the pressing roll 3 into a guide tube 6 and further into a bore. The wire rope 5 is fed, for example from below, from point 7 onto a bending roll 8, which is at a different level vertically than the feeding roll 2. The bending roll 8 is attached by means of bearing boxes 9, which can be moved in the feeding direction by means of a hydraulic cylinder 10, and thereby the force of the bending can be affected.

Figure 2:
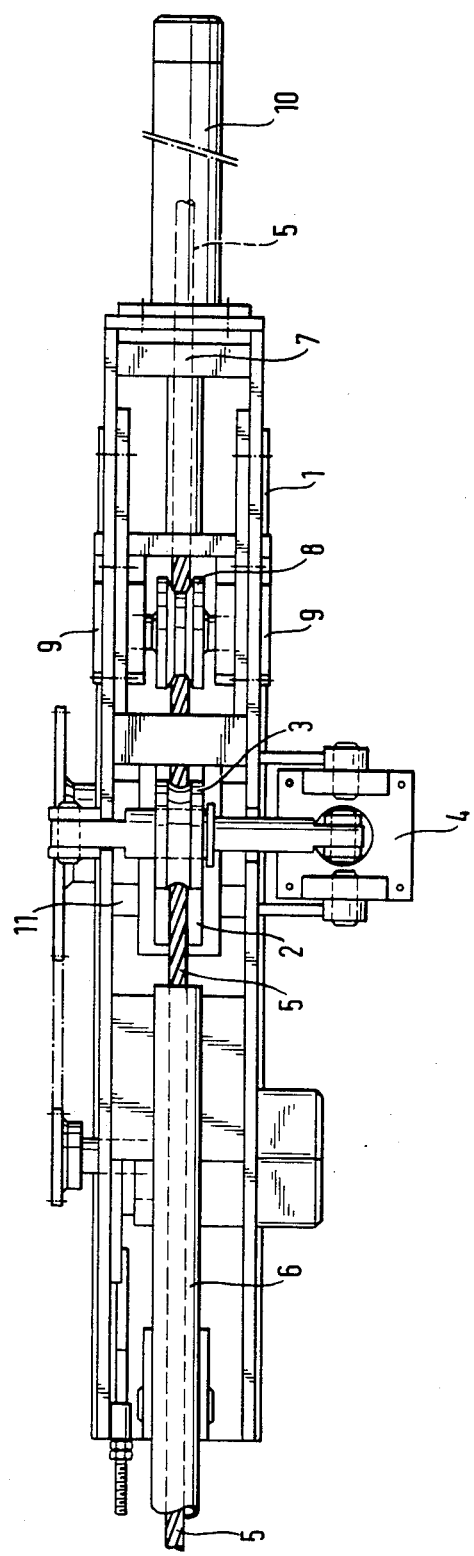
FIG. 2 depicts a top view of the same embodiment.

In FIG. 2 the same mechanism is depicted as seen from the top; the bearing of the shaft of the feeding roll 2 is indicated by numeral 11.

The wire rope bolt 5 is placed between the feeding roll 2 and the pressing roll 3 which is pressed against it by the compressed air cylinder, the feeding roll is caused to rotate by means of the hydraulic engine, and the wire rope is fed into a hole in a rock excavation. The profile of the feeding roll, preferably a V-groove, and a coarse-stranded, helical, prestressed steel wire rope bolt 5 tend to cause the wire rope bolt to rotate during the feeding. The bending roll 8 is set by means of the hydraulic cylinder 10 in such a way that it causes the wire rope bolt to bend during the feeding of the bolt. During the feeding the bending causes the bolt to arch, and the simultaneous rotation caused by the shape of the feeding roll causes the wire rope bolt to take a helical shape.

Figure 3:
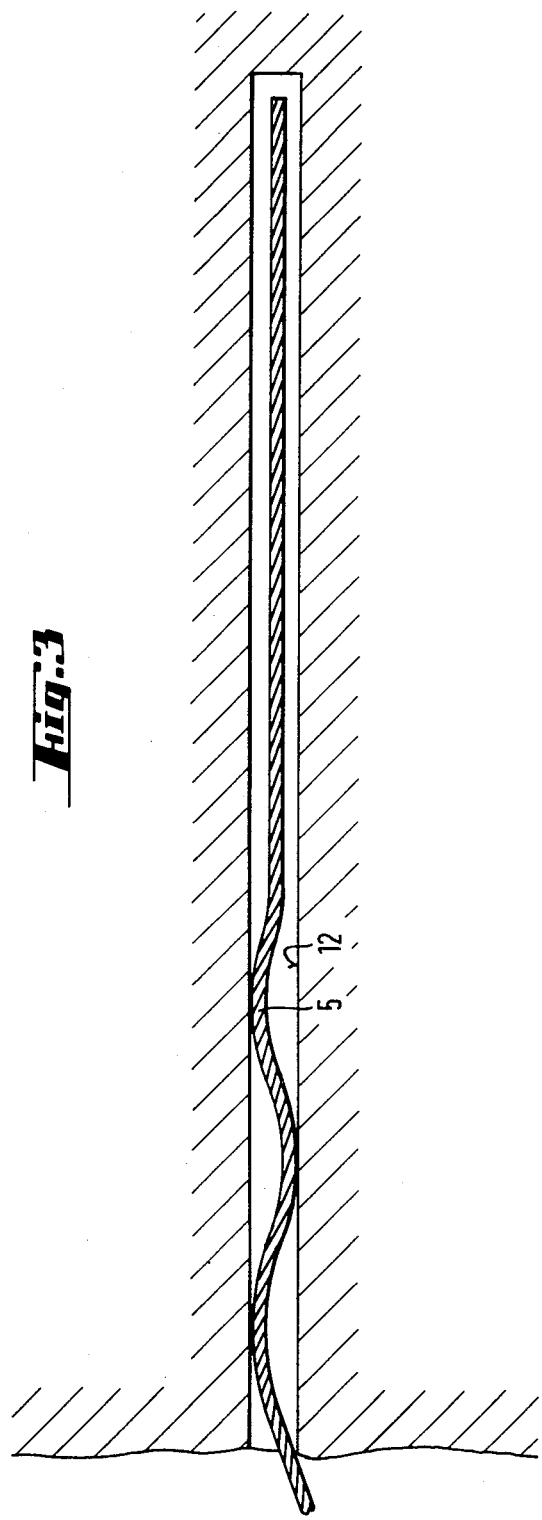
FIG. 3 depicts a section of a bore in which a wire rope bolt has been anchored preliminarily in accordance with the invention.

When entering the bore 12, the wire rope bolt 5 becomes tensioned against the wall of the bore (FIG. 3) and is kept in the bore by friction. The arching, and thereby also the spring force of the bolt in the bore, can be changed by adjusting the position of the bending roll 8. A sufficient holding force is obtained even if the whole wire rope bolt is not bent. The required holding force is obtained when the trailing end of the bolt, preferably 1/5, is bent.

The power engine used for rotating the feeding roll 2 can be, instead of a hydraulic engine, a compressed-air or electric motor, for example. The feeding force can be increased by increasing the number and the compressive force of the feeding rolls and the pressing rolls. For example, screw motors or electric shaft and linear motors are also usable for adjusting the position of the bending roll.

By means of the method and mechanism described above, a wire rope bolt can be fed into a bore and preliminarily anchored in it. After the preliminary anchoring, the bolt can be grouted in the bore, and the bolt remains firmly in the bore already during the anchoring.

What is claimed is:

1. A method of preliminarily anchoring a plural strand metal wire rope bolt in a bore prior to and to facilitate permanent anchoring comprising in a continuous operation the steps of:
   (a) feeding and permanently deforming the wire rope to be anchored by bending the same to form at least one arched portion therein; and
   (b) progressively feeding the arched portion into the bore so that the arched portion of the wire rope frictionally presses against the wall of the bore.

2. A method according to claim 1, wherein the arched portion in the wire rope bolt is produced over only a part of the length of the bolt.

3. A method according to claim 1, which comprises producing in the wire rope bolt a helix having a diameter greater than that of the bore by bending and rotating the wire rope bolt.

4. A method according to claim 2, which comprises deforming the wire rope bolt in only the trailing part of the bolt.

5. A method according to claim 4, which comprises deforming the wire rope bolt in only 1/5 of the trailing part of the bolt.

6. The method of claim 1 wherein the step of feeding is performed by simultaneously advancing said arched portion into said bore while rotating said arched portion.

7. The method of claim 6 wherein said step of permanently deforming is performed by deforming a portion of the wire rope into the form of a helix to define said arched portion.

* * * * *